United States Patent
Kováč

(10) Patent No.: US 10,255,436 B2
(45) Date of Patent: Apr. 9, 2019

(54) CREATING RULES DESCRIBING MALICIOUS FILES BASED ON FILE PROPERTIES

(71) Applicant: Avast Software s.r.o., Prague (CZ)

(72) Inventor: Peter Kováč, Prague (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 88 days.

(21) Appl. No.: 15/275,179

(22) Filed: Sep. 23, 2016

(65) Prior Publication Data
US 2017/0091451 A1  Mar. 30, 2017

Related U.S. Application Data

(60) Provisional application No. 62/232,791, filed on Sep. 25, 2015.

(51) Int. Cl.
*G06F 21/56* (2013.01)

(52) U.S. Cl.
CPC .......... *G06F 21/562* (2013.01); *G06F 21/564* (2013.01); *G06F 2221/034* (2013.01)

(58) Field of Classification Search
CPC ..................................... G06F 21/562–21/564
See application file for complete search history.

(56) References Cited

U.S. PATENT DOCUMENTS

| | | | | |
|---|---|---|---|---|
| 5,119,470 A * | 6/1992 | Highland | ............... | G06N 5/046 706/47 |
| 8,028,338 B1 * | 9/2011 | Schneider | ............. | G06F 21/564 713/188 |
| 8,201,244 B2 * | 6/2012 | Sun | ........................ | G06F 21/566 726/22 |
| 8,806,641 B1 | 8/2014 | Li et al. | | |
| 8,826,439 B1 * | 9/2014 | Hu | ........................ | G06F 21/563 726/24 |
| 2005/0262567 A1 * | 11/2005 | Carmona | .............. | G06F 21/561 726/24 |
| 2008/0127336 A1 * | 5/2008 | Sun | ........................ | G06F 21/566 726/22 |
| 2009/0044273 A1 * | 2/2009 | Zhou | ..................... | G06F 21/564 726/24 |
| 2013/0097706 A1 * | 4/2013 | Titonis | .................... | G06F 21/56 726/24 |

OTHER PUBLICATIONS

Alazab, Mamoun & Venkatraman, Sitalakshmi & Watters, Paul & Alazab, Moutaz. "Zero-day Malware Detection based on Supervised Learning Algorithms of API call Signatures", 2011, In Proceedings of Australasian Data Mining Conference (AusDM 11), vol. 121.*

(Continued)

*Primary Examiner* — Farid Homayounmehr
*Assistant Examiner* — Zhimei Zhu
(74) *Attorney, Agent, or Firm* — Husch Blackwell LLP

(57) ABSTRACT

Systems and methods automatically determine rules for detecting malware. A fingerprint representing a file is received. A set of nearest neighbor fingerprints from at least a set of malware fingerprints that are nearest neighbors are determined. The set of malware fingerprints are analyzed to determine a representative fingerprint. A malicious file detection rule is generated based, at least in part, on the representative fingerprint.

33 Claims, 4 Drawing Sheets

(56) References Cited

OTHER PUBLICATIONS

Sathyanarayan et al., Signature Generation and Detection of Malware Families, 2008, pp. 336-349, Springer-Verlag Berlin Heidelberg.
Walenstein et al., Header Information in Malware Families and Impact on Automated Classifiers, 2010, 8 Pages, Department of Computer Science, University of Louisiana at Lafayette, Lafayette, LA, USA.
Karthik Raman, Selecting Features to Classify Malware, 2012, 5 Pages, Adobe Systems, Inc., San Francisco, CA, USA.
AnalyzePE, Adobe Malware Classifier, pp. 1-12, https://github.com/hiddenillusion/AnalyzePE/blob/master/AdobeMalwareClassifier.py#L1, Accessed Dec. 21, 2016.

* cited by examiner

118

FINGERPRINT

| CLASS | | | ⌒ 202 |
|---|---|---|---|
| FEATURE 1 DATA | TYPE | SEMANTIC | ⎫ |
| FEATURE 2 DATA | TYPE | SEMANTIC | ⎬ ⌒ 204 |
| ⋮ | ⋮ | ⋮ | |
| FEATURE N DATA | TYPE | SEMANTIC | ⎭ |
| 206 | 208 | 210 | |

FIG. 2

CREATING RULES DESCRIBING MALICIOUS FILES BASED ON FILE PROPERTIES

CROSS-REFERENCE TO RELATED APPLICATIONS

This application claims priority to U.S. Provisional Patent Application Ser. No. 62/232,791, filed on Sep. 25, 2015, to Peter Kovác, entitled CREATING RULES DESCRIBING MALICIOUS FILES BASED ON FILE PROPERTIES, the entire disclosure of which is incorporated herein by reference.

FIELD

The disclosure relates generally to detecting malware files, and more particularly, to creating rules that describe malicious files.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed. A file that contains malware can be referred to as a malicious file.

In the face of the growing threat of malware, many anti-malware software packages were developed to detect malware in a user's files. Upon detection, the anti-malware software may notify the user of the presence of the malware, and may automatically remove or quarantine the malware. Detecting malware can be a difficult task, because millions of new files are created every day.

SUMMARY OF THE INVENTION

Systems and methods automatically determine rules for detecting malware. A fingerprint representing a file is received. A set of nearest neighbor fingerprints from at least a set of malware fingerprints that are nearest neighbors are determined. The set of malware fingerprints are analyzed to determine a representative fingerprint. A malicious file detection rule is generated based, at least in part, on the representative fingerprint.

Methods and related systems include (a) receiving a fingerprint, wherein the fingerprint comprises a data structure representing a file; (b) determining a set of nearest neighbor fingerprints from at least a set of malware fingerprints; (c) creating a cluster set of fingerprints; (d) analyzing the cluster set of fingerprints to create a cluster representative fingerprint; (e) determining an initial description rule based on analyzing the cluster set of fingerprints, wherein the initial description rule describes the cluster representative fingerprint and the received fingerprint; (f) determining a candidate rule from the initial description rule; (g) adding the candidate rule to a candidate rule set; (h) determining whether a size of the cluster set can be reduced, (i) wherein, when it is determined that the size of the cluster set can be reduced, reducing the size of the cluster set to create a new cluster set of fingerprints and repeating steps (d)-(i), and (j) wherein, when it is determined that the size of a cluster set cannot be reduced, selecting a final rule from the candidate set. Selecting a final rule may include selecting a rule from the candidate rules in the candidate rule set that has the highest $H_{malunk}$, selecting a rule having the least number of conditions, and selecting a last candidate rule generated in the candidate rule set. Methods further include applying the final rule to the received fingerprint to determine if the file corresponding to the received fingerprint is a malicious file.

BRIEF DESCRIPTION OF THE DRAWINGS

For a better understanding of the inventive subject matter, reference may be made to the accompanying drawings in which:

FIG. 2 illustrates an example file fingerprint.

DETAILED DESCRIPTION

Figure 1:
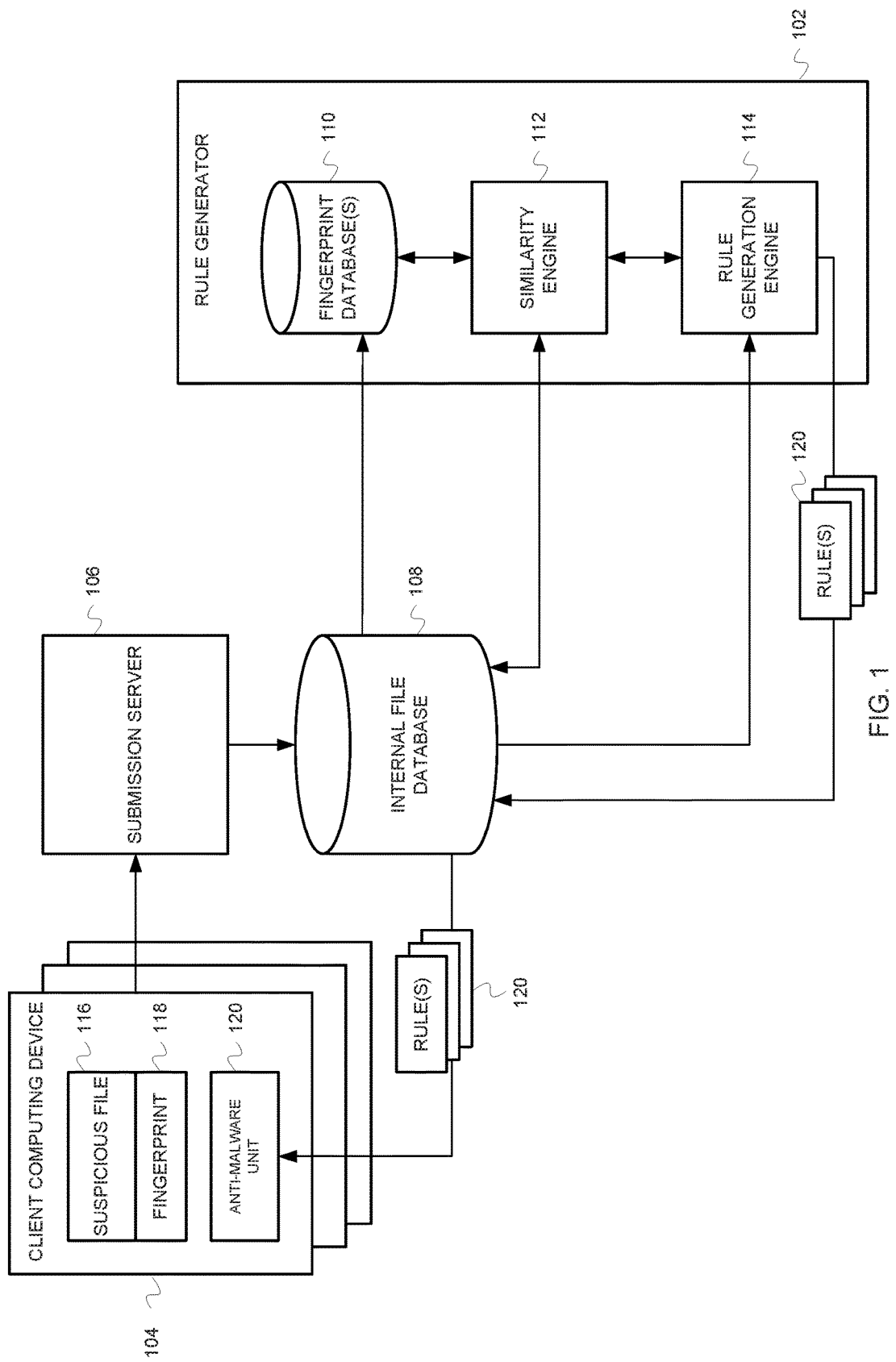
FIG. 1 is a block diagram of illustrating components of a system for automatically generating rules that describe malicious files.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of illustrating components of a system 100 for automatically generating rules that describe malicious files. In some embodiments, system 100 includes rule generator 102, client computing device 104, submission server 106, and internal file database 108.

Client computing device 104 can be a desktop computer, laptop computer, tablet computer, smart phone, personal digital assistant, media player, set top box, or any other device having one or more processors and memory for executing computer programs. The embodiments are not limited to any particular type of computing device. Client computing device 104 can include an anti-malware unit 120. Anti-malware unit 120 can include one or more of software, firmware or other programmable logic that can detect malicious files. Additionally, anti-malware unit 120 can submit a suspicious file 116 for analysis. The file may be determined to be suspicious based on information from other anti-malware systems, of from relevant data about the file. For example, the source of the file (either URL or disk path) may indicate that the file is from a suspicious source. Further, the file may be suspicious if the file has only been seen on a low number of systems (e.g., the file may be a day one malware source). In some embodiments, ant-malware unit 120 can generate a fingerprint 118 that is a data structure used to represent aspects of suspicious file 116. The data structure can include features of a file. In general, features can be any descriptive element of a file or file metadata such as file size, file type etc. Further details on fingerprint 118 are provided below with respect to FIG. 2.

Client computing device 104 can submit suspicious file 116 and fingerprint 118 to submission server 106. Submission server 106 can perform preprocessing on the suspicious file 116 and place the results of the preprocessing in an internal file database 108. In some aspects, the preprocessing can include "uniquization", i.e., determining that the file is not processed more than once, receiving file metadata from other systems (e.g., receiving data regarding how often the file has been seen on customer systems), or running other anti-malware software on the file. In some aspects, the source of the file (i.e., a URL and/or disk path) may be stored in the internal file database.

Rule generator 102 can receive data from internal file database 108 and use the data to automatically generate rules that describe malicious files. In some embodiments, rule generator 102 can include a fingerprint database 110, a similarity engine 112, and a rule generation engine 114. Fingerprint database 110 comprises one or more databases that contain fingerprint data. In some embodiments, the fingerprint database includes three databases of fingerprints: a malwareset, a cleanset, and unknownset. Malwareset fingerprints are associated with malicious files that are known to contain malware. Cleanset fingerprints are associated with files that are known to be free from malware. Unknownset fingerprints are fingerprints that have been submitted for classification, but no classification has yet been made or no classification could be determined. In some aspects, fingerprints in the cleanset database are maintained indefinitely, i.e., the cleanset database contains all of the clean classified fingerprints that have ever been seen. The malwareset and unknownset database can contain fingerprints for a sixty day window. That is, only fingerprints seen in the most recent sixty days are maintained in the malwareset and unknownset. In some embodiments, a separate database can be maintained for each classification (cleanset, malwareset, unknownset) of fingerprint. In alternative embodiments, a single database can be maintained that holds all three classifications.

Similarity engine 112 utilizes data from internal file database 108 and fingerprint database 110 to determine a similarity of an input fingerprint with fingerprints in fingerprint database 110.

Rule generation engine 114 receives output from similarity engine 112 and generates a rule that can be applied to a fingerprint to determine if the fingerprint is associated with a malicious file. A rule can include one or more conditions regarding the features contained in a fingerprint. In some aspects, a condition in a rule can have the form:

<feature> <operator> <argument(s)> where feature is one of the features contained in the fingerprint, operator can be an operation that is applied to the feature and the argument(s) in the condition, and argument(s) can be numerical or string literals. In some aspects, the operators can include one of {==, !=, RANGE, !RANGE}. Those of skill in the art having the benefit of the disclosure will appreciate that many other operators are possible and within the scope of the inventive subject matter. The set of operators that are used in rules can have an impact on the execution speed of the system. Use of a relatively small set of operators can reduce the number of possible candidate rules thereby limiting the search space for rules and reducing the amount of time and resources it takes to determine a good rule. Thus, the number of operators can depend on the response requirements of the system. In embodiments that can achieve real time or near real time response, the number of operators can be more limited than in embodiments that do not attempt to achieve real time response. The number of arguments in a rule depends on the operator used. A feature may be used multiple times in one rule. In some aspects, in order for a rule to match a fingerprint, all of its conditions must evaluate to true.

Some embodiments can be configured to use available GPU (Graphics Processor Units) to process data. In such embodiments, the incoming data may be mapped and/or reordered, perhaps during a data loading process, in a manner that favors the parallel processing capabilities of GPUs. For example, in some embodiments, incoming data may be in the form of records that are stored in a random order with indices to indicate a position of a record, and where a record is stored as a block of data. The incoming data may be processed to order the records on the disk, and to organize the data as a columnar database such that there is a block of data per attribute.

Further details on the operation of the above-describe system are provided below with reference to FIG. 3.

FIG. 2 illustrates an example fingerprint 118. A fingerprint 118 can include a class 202 and a vector of features 204. Class 202 describes whether the fingerprint represents a clean file, a malicious file, or is undecided. Upon initial creation, a default class of undecided is assigned. The vector can be obtained by analyzing the file (e.g., by anti-malware unit 120) do determine the features of the file. In some aspects, the feature can include feature data 206, type 208 and semantic 210. Feature data 206 can be the actual feature data extracted from the file. Type 208 describes the data type for the feature data 206. Examples of such types include signed integer, unsigned integer, string, etc. Semantic 210 can provide a higher level meaning or description of a feature. For example, semantic 210 can describe the feature data 206 as a simple value, an offset, a checksum etc.

Figure 3:
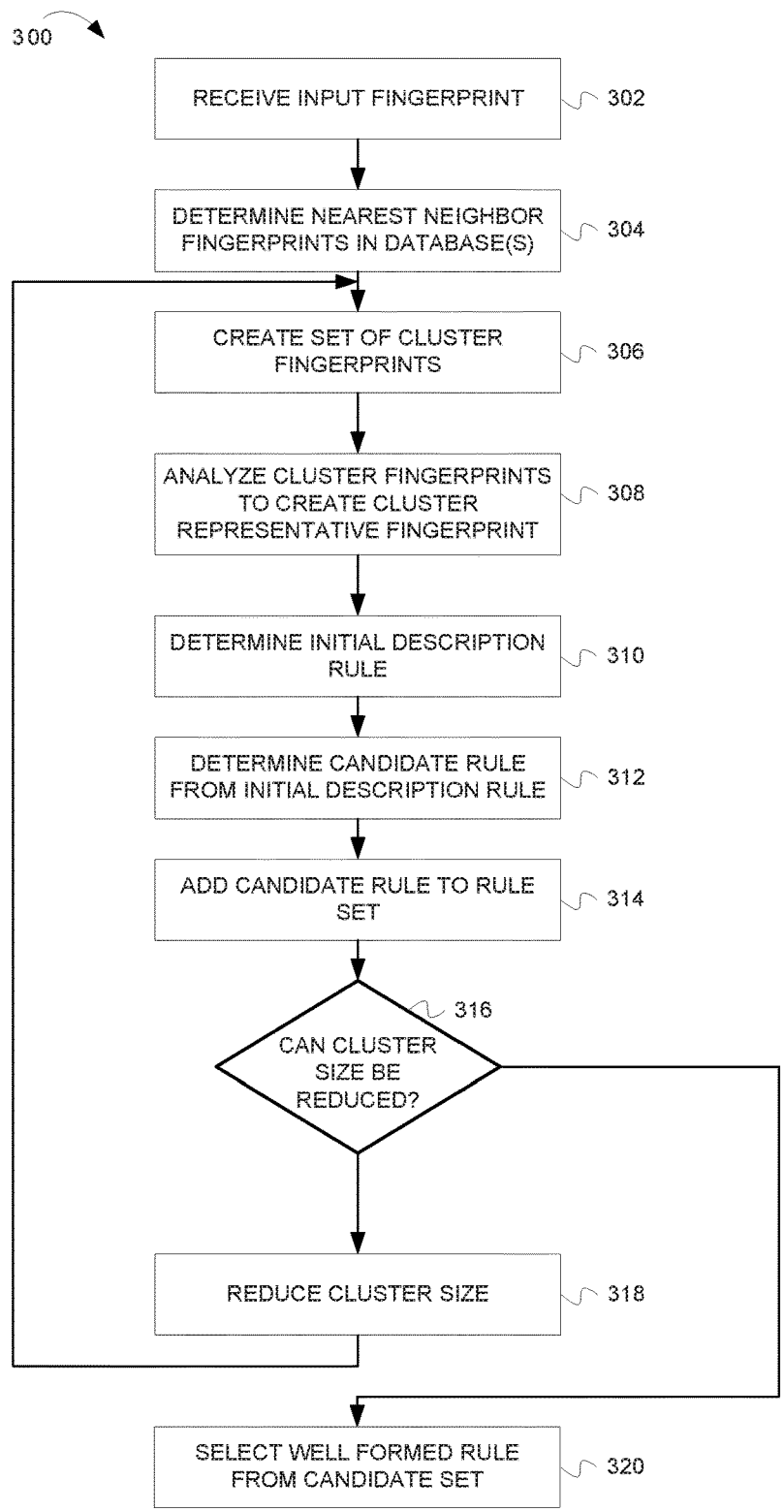
FIG. 3 is a flow chart illustrating operations of a method for automatically creating a rule to describe malicious files.

FIG. 3 is a flow chart 300 illustrating operations of a method for automatically creating a rule to describe malicious files. At block 302, the rule generator 102 receives an input fingerprint.

At block 304, the three databases (malwareset, cleanset and unknownset) are queried to determine the nearest neighbors of the input fingerprint. The nearest neighbor can be determined using a distance function. In some aspects, the distance function can provide an evaluation of the similarity of two fingerprints based on their respective feature values, and provides an output representing the distance between the two input fingerprints. Different features may be evaluated differently in order to determine their contribution to the distance function. For example, numeric values can be compared using direct numeric comparison operations, while features that comprise multiple bytes or variable length data (e.g., dates, text strings) may be compared differently. The distance function D(a,b) can have the following properties for fingerprints a and b:
1) non-negativity: D(a,b)>=0
2) identity of indiscernible: D(a,a)=0
3) symmetry: D(a,b)=D(b,a)
4) triangle inequality: D(a,c)<=D(a,b)+D(b,c)

In some aspects, up to 256 nearest neighbors are chosen from each database. Those of skill in the art having the benefit of the disclosure will appreciate that other numbers of nearest neighbors may be chosen. The choice of a particular number may be determined empirically and/or may be based on a number that is large enough to provide sufficient information while being small enough to be processed within any relevant time constraints. The nearest neighbors may include those fingerprints that are closer (e.g., according to the distance function) than a given threshold. The closeness threshold can be chosen to ensure that files within the threshold are most likely to have at least some degree of similarity between them. The threshold can be different for each database. For example, the clean database may have a higher threshold than the database of malicious software. Files in the clean database are more likely to be less similar than files in the malicious software database. In order to avoid false positives, a higher threshold may be used for the clean database. It should be noted that as a result of using a threshold, there may be less than 256 nearest neighbors.

At block 306, a cluster set of fingerprints is formed using the nearest neighbors from the malwareset and unknownset.

At block 308, the cluster fingerprints are analyzed to determine a cluster representative fingerprint. Features of the fingerprints are analyzed across the cluster. In some aspects, any feature that has a checksum semantic may be used in determining a distance between files, but can be discarded for use in a rule. A checksum is useful for determining a distance between files, but is not typically useful in identifying polymorphic malware. Additionally, some features that have been determined not to be useful may be placed on a blacklist. Any features on the blacklist may be used for determining a distance between files, but can be discarded for use in a rule. For example, a file size may be a relevant feature for use in determining a distance between files. However, malware authors know it is easy to change the size of a file to avoid detection, so file size is not necessarily useful in a rule. Therefore, file size may be a blacklisted feature.

The remaining features can be analyzed to determine which of three scenarios are present:
1) The feature has identical values in each fingerprint in the cluster—the value is used in the cluster representative fingerprint.
2) The values are different but the feature itself is of integral type—instead of a single value the whole range of values is taken (from minimum to maximum) unless this feature has the bitfield semantic, then its ignored.
3) The values are different and the feature is not of integral type—no value is selected for the typical representative and the feature is ignored.

At block 310, an initial description rule is determined after the features of the cluster fingerprints have been analyzed at block 308. In some aspects, the initial description rule includes one condition per valid feature.

At block 312, a candidate rule is determined from the initial description rule. The initial description rule obtained at block 310 perfectly describes the cluster representative fingerprint and by definition also the input fingerprint (which is the ultimate goal of the rule generation). However, the initial description rule is most likely too generic and too large. At block 312, the initial description rule can be transformed into a well formed rule by removing conditions from the initial description rule. A well formed rule is a rule that does not match any fingerprints in the cleanset database and at the same time matches at least two distinct fingerprints in the malwareset database. The rule generation engine 114 can use two parameters $R_{min}$ and $R_{max}$ which set the minimum and maximum size (number of conditions) that a final candidate rule may have. The following algorithm can be used:
1) If any fingerprints from cleanset match the initial description then quit (no rule generated)
2) For S in range from <$R_{min}$;$R_{max}$> do:
   a. Pick S random conditions from the initial description rule and form a new rule using only those selected conditions
   b. Calculate $H_{cln}$ as the number of fingerprints the new rule matches on cleanset and $H_{malunk}$ as the number of fingerprints the new rule matches on malwareset and unknownset together. Discard any new rule that has $H_{cln}$>0.
   c. Repeat steps a) and b) for I iterations (where I is a parameter of the rule generation engine 114).
3) From all new rules remaining from step 2) choose the one with the highest value of $H_{malunk}$. If there are more candidates choose the smallest one (in terms of number of conditions). If there are still multiple possible candidates, choose the last one generated.

At block 314, the candidate rule determined at block 312 is added to a candidate rule set.

At block 316, a decision is made to determine if the cluster size can be reduced. If the cluster size can be reduced, then in some aspects, at block 318 the cluster size is halved at each iteration until a cluster size of one is reached. The method then returns to block 306 to repeat the execution of blocks 306-316.

If the cluster size cannot be reduced, then at block 320, a well formed rule from the candidate rule set is selected as the final rule. In some aspects, the well formed rule with the highest $H_{malunk}$ is selected as the final rule. The final rule can be included in the rules 120 that are distributed to client computing devices 104.

It should be noted that the above-described systems and methods can be generalized to any vector composed of at least one feature and thus is not limited to just executable files on a personal computing platform. For example, it is possible to deploy a similar system for smart phones (e.g., Android packages).

Figure 4:
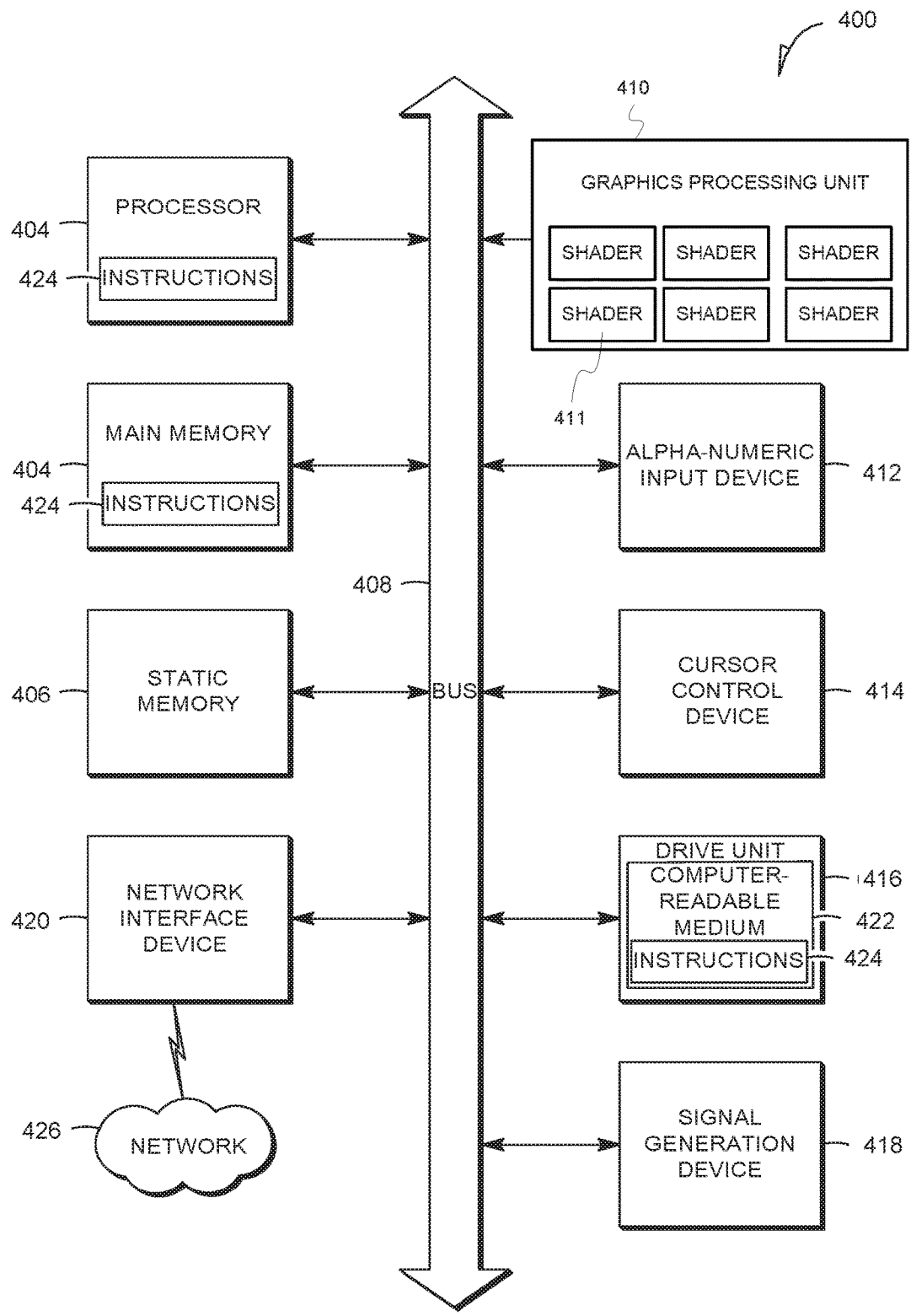
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402, a main memory 404 and a static memory 406, which communicate with each other via a bus 408. The computer system 400 may further include graphics processing unit 410 that may be coupled to a video display unit (e.g., a liquid crystal display (LCD) or a cathode ray tube (CRT)).

A graphics processing unit 410 may include multiple shaders 411 that can be programmed to execute some or all of the above-described rule generation functionality In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for generating a malicious file detection rule, the method comprising:
   receiving a fingerprint representing features of a file;
   determining a set of nearest neighbor fingerprints to the fingerprint from at least a set of malware fingerprints;
   analyzing the set of nearest neighbor fingerprints to determine a representative fingerprint; and
   creating the malicious file detection rule based, at least in part, on the representative fingerprint, wherein the malicious file detection rule comprises a plurality of conditions, each condition associated with a feature contained in the fingerprint, and wherein each condition includes an operator, the operator to be applied upon evaluation of the rule to the feature and one or more arguments associated with the condition;
   applying the malicious file detection rule to the received fingerprint to determine if the file corresponding to the received fingerprint is a malicious file.

2. The method of claim 1, wherein said determining a set of nearest neighbor fingerprints from at least a set of malware fingerprints comprises using a distance function.

3. The method of claim 2 further comprising providing a plurality of datasets, wherein a first dataset comprises a dataset indicative of files that are known to be free of malware, a second dataset comprises said malware fingerprints, and a third dataset comprises a dataset indicative of files for which it is unknown whether the files indicated in the third dataset contain malware.

4. The method of claim 3, wherein said determining a set of nearest neighbor fingerprints comprises querying said first, said second, and said third dataset.

5. The method of claim 4, wherein said determining a set of nearest neighbor fingerprints comprising querying said first, said second, and said third dataset comprises choosing a plurality of nearest neighbors to said fingerprint from each of said first dataset, said second dataset, and said third dataset.

6. The method of claim 5, further comprising establishing a distance threshold and wherein said determining a set of nearest neighbor fingerprints comprises choosing a plurality of nearest neighbors to said fingerprint that are within a distance corresponding to said distance threshold.

7. The method of claim 5, further comprising establishing at least a first distance threshold for said first dataset and a second distance threshold for said second dataset.

8. The method of claim 7, wherein the first distance threshold for the first dataset indicative of files that are known to be free of malware is higher than the distance threshold for the second dataset indicative of files that are known to contain malware.

9. The method of claim 4, said method further comprising forming a cluster set of fingerprints using the nearest neighbors from the second dataset indicative of files known to contain malware and the third dataset indicative of files for which it is unknown whether the files in the third dataset contain malware.

10. The method of claim 9, said method further comprising analyzing the cluster set of fingerprints to determine a cluster representative fingerprint by analyzing features of fingerprints in the cluster set.

11. The method of claim 10, wherein each said fingerprint in said cluster set of fingerprints comprises features, wherein said analyzing the cluster set of fingerprints comprises analyzing said features of said fingerprints in the cluster set, said method further comprising enabling use of a blacklist of blacklisted features for determining a distance between files but not using said blacklisted features on the blacklist in the malicious file detection rule.

12. The method of claim 11, said method further comprising:
   analyzing each of a plurality of features other than those on said blacklist to determine an indication of at least one of the following three scenarios for each analyzed feature:
   (i) the feature has a value that is identical to values in each fingerprint in the cluster set,
   (ii) the feature has a value that differs from values in other fingerprints in the cluster set, but the feature itself is of an integral type, and
   (iii) the feature has a value that differs from values in other fingerprints in the cluster set, but the feature itself is not of an integral type.

13. The method of claim 12, said method further comprising:
   when it is determined as a result of said analyzing a feature of said plurality of features other than those on the blacklist that scenario (i) is present, using the value of the feature in the cluster representative fingerprint;
   when it is determined as a result of said analyzing a feature of said plurality of features other than those on the blacklist that scenario (ii) is present, a range of the values is used in the cluster representative fingerprint unless the feature has a bitfield semantic in which case the feature is ignored; and
   when it is determined as a result of said analyzing a feature of said plurality of features other than those on the blacklist that scenario (iii) is present, no value is selected for the cluster representative fingerprint and the feature is ignored.

14. The method of claim 10, said method further comprising determining an initial description rule based on said analyzing the cluster set of fingerprints, wherein said initial description rule describes a cluster representative fingerprint and the received fingerprint.

15. The method of claim 14, said method further comprising transforming the initial description rule into a well formed rule, wherein said well formed rule comprises a rule that does not match any fingerprints in the first dataset indicative of files that are known to be free of malware and matches at least two distinct fingerprints in the second dataset indicative of files that are known to contain malware.

16. The method of claim 14, said method further comprising using two parameters $R_{min}$ and $R_{max}$ which set, respectively, a minimum number of conditions and a maximum number of conditions that a final candidate rule may have and processing the following steps:
  a) when any fingerprints from the first dataset indicative of files that are known to not have malware match the initial description rule, no candidate rule is generated;
  (b) when a fingerprint has a number of conditions (N) in the range from $<R_{min};R_{max}>$,
    i) randomly selecting N conditions from the initial description rule and forming a new candidate rule using only those selected conditions; and
    ii) calculating $H_{cln}$ as the number of fingerprints the new candidate rule matches with fingerprints in the first dataset, calculating $H_{malunk}$ as the number of fingerprints the new candidate rule matches on fingerprints in the combination of the second and third datasets, and discarding any candidate new rule that has $H_{cln}>0$; and
  (c) from all new rules remaining from step (b), selecting as a final rule the candidate rule with the highest value of $H_{malunk}$.

17. The method of claim 16 wherein, when following step (c) there is more than one candidate rule remaining, said method further comprising processing a step (d) comprising selecting as a final rule from the candidate rules remaining following step (c) a rule having the least number of conditions.

18. The method of claim 17 wherein, when following step (d) there is more than one candidate rule remaining, said method further comprising processing a step (e) comprising selecting as a final rule from the candidate rules remaining following step (d) the last candidate rule generated.

19. The method of claim 14, said method further comprising determining a candidate rule from the initial description rule and adding the candidate rule to a candidate rule set.

20. The method of claim 19, said method further comprising:
  determining if a size of the cluster set can be reduced,
  wherein, when it is determined that the size of the cluster set can be reduced, performing iterations on the cluster set until a cluster size of one is reached, and
  wherein, when it is determined that the size of the cluster set cannot be reduced, then selecting a final rule from the candidate rule set.

21. The method of claim 20, said method further comprising selecting as the final rule the rule with the highest $H_{malunk}$.

22. The method of claim 21, said method further comprising enabling the final rule to be distributed to computing devices.

23. A method comprising:
  (a) receiving a fingerprint, wherein said fingerprint comprises a data structure representing a file;
  (b) determining a set of nearest neighbor fingerprints from at least a set of malware fingerprints;
  (c) creating a cluster set of fingerprints;
  (d) analyzing the cluster set of fingerprints to create a cluster representative fingerprint;
  (e) determining an initial description rule based on said analyzing said cluster set of fingerprints, wherein said initial description rule describes said cluster representative fingerprint and the received fingerprint;
  (f) determining a candidate rule from the initial description rule;
  (g) adding the candidate rule to a candidate rule set;
  (h) determining whether a size of the cluster set can be reduced,
  (i) wherein, when it is determined that the size of the cluster set can be reduced, reducing the size of the cluster set to create a new cluster set of fingerprints and repeating steps (d)-(i), and
  (j) wherein, when it is determined that the size of a cluster set cannot be reduced, selecting a final rule from the candidate set;
  (k) applying the final rule to the received fingerprint to determine if the file corresponding to the received fingerprint is a malicious file.

24. The method of claim 23, wherein said step of selecting a final rule from the candidate rule set comprises selecting a rule from the candidate rules in the candidate rule set that has the highest $H_{malunk}$.

25. The method of claim 24, wherein said candidate rules in the candidate rule set have at least one condition, wherein said step of selecting a final rule from the candidate rule set further comprises selecting a rule having the least number of conditions.

26. The method of claim 25, wherein said step of selecting a final rule from the candidate rule set further comprises selecting a last candidate rule generated in the candidate rule set.

27. The method of claim 23, said method further comprising applying the final rule to the received fingerprint to determine if the file corresponding to the received fingerprint is a malicious file.

28. A non-transitory computer readable medium containing program instructions for performing a method, said method comprising:
  receiving a fingerprint representing features of a file;
  determining a set of nearest neighbor fingerprints to the fingerprint from at least a set of malware fingerprints;
  analyzing the set of nearest neighbor fingerprints to determine a representative fingerprint; and
  creating a malicious file detection rule based, at least in part, on the representative fingerprint, wherein the malicious file detection rule comprises a plurality of conditions, each condition associated with a feature contained in the fingerprint, and wherein each condition includes an operator, the operator to be applied upon evaluation of the rule to the feature and one or more arguments associated with the condition;
  applying the malicious file detection rule to the received fingerprint to determine if the file corresponding to the received fingerprint is a malicious file.

29. A non-transitory computer readable medium containing program instructions for performing a method, said method comprising:
  (a) receiving a fingerprint, wherein said fingerprint comprises a data structure representing a file;
  (b) determining a set of nearest neighbor fingerprints from at least a set of malware fingerprints;
  (c) creating a cluster set of fingerprints;
  (d) analyzing the cluster set of fingerprints to create a cluster representative fingerprint;
  (e) determining an initial description rule based on said analyzing said cluster set of fingerprints, wherein said initial description rule describes said cluster representative fingerprint and the received fingerprint;
  (f) determining a candidate rule from the initial description rule;
  (g) adding the candidate rule to a candidate rule set;
  (h) determining whether a size of the cluster set can be reduced, (i) wherein, when it is determined that the size of the cluster set can be reduced, reducing the size of the cluster set to create a new cluster set of fingerprints and repeating steps (d)-(i), and (j) wherein, when it is determined that the size of a cluster set cannot be reduced, selecting a final rule from the candidate set;

(k) applying the final rule to the received fingerprint to determine if the file corresponding to the received fingerprint is a malicious file.

30. The non-transitory computer readable medium of claim 29 further containing program instructions for performing the method comprising wherein said step of selecting a final rule from the candidate rule set comprises selecting a rule from the candidate rules in the candidate rule set that has the highest $H_{malunk}$.

31. The non-transitory computer readable medium of claim 30 further containing program instructions for performing the method comprising wherein said candidate rules in the candidate rule set have at least one condition, wherein said step of selecting a final rule from the candidate rule set further comprises selecting a rule having the least number of conditions.

32. The non-transitory computer readable medium of claim 31 further containing program instructions for performing the method comprising wherein said step of selecting a final rule from the candidate rule set further comprises selecting a last candidate rule generated in the candidate rule set.

33. The non-transitory computer readable medium of claim 29 further containing program instructions for performing the method comprising applying the final rule to the received fingerprint to determine if the file corresponding to the received fingerprint is a malicious file.

* * * * *